(12) United States Patent
McGraw et al.

(10) Patent No.: US 11,765,037 B2
(45) Date of Patent: Sep. 19, 2023

(54) METHOD AND SYSTEM FOR FACILITATING HIGH AVAILABILITY IN A MULTI-FABRIC SYSTEM

(71) Applicant: Hewlett Packard Enterprise Development LP, Houston, TX (US)

(72) Inventors: Montgomery C. McGraw, Magnolia, TX (US); Dwight D. Riley, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 97 days.

(21) Appl. No.: 16/997,473

(22) Filed: Aug. 19, 2020

(65) Prior Publication Data
US 2022/0060382 A1 Feb. 24, 2022

(51) Int. Cl.
| | |
|---|---|
| *H04L 12/66* | (2006.01) |
| *H04L 41/12* | (2022.01) |
| *H04L 49/00* | (2022.01) |
| *H04L 49/10* | (2022.01) |
| *H04L 49/356* | (2022.01) |

(52) U.S. Cl.
CPC .............. *H04L 41/12* (2013.01); *H04L 49/10* (2013.01); *H04L 49/70* (2013.01); *H04L 49/356* (2013.01)

(58) Field of Classification Search
CPC ......... H04L 41/12; H04L 49/10; H04L 49/70; H04L 49/356; H04L 43/0811; H04L 45/02; H04L 45/26; H04L 45/308; H04L 45/28; H04W 40/24; G06F 11/1446
See application file for complete search history.

(56) References Cited

U.S. PATENT DOCUMENTS

| | | | |
|---|---|---|---|
| 2003/0005039 A1* | 1/2003 | Craddock | G06F 9/4416 709/203 |
| 2004/0022257 A1* | 2/2004 | Green | H04L 12/4641 370/401 |
| 2004/0024903 A1* | 2/2004 | Costatino | H04L 45/00 709/238 |
| 2014/0140348 A1* | 5/2014 | Perlman | H04L 45/38 370/400 |
| 2015/0372840 A1* | 12/2015 | Benny | H04L 45/38 370/409 |
| 2016/0366046 A1* | 12/2016 | Anantharam | H04L 45/026 |

(Continued)

FOREIGN PATENT DOCUMENTS

WO WO-2021055634 A1 * 3/2021 ............. H04L 45/02

*Primary Examiner* — Thai D Hoang
(74) *Attorney, Agent, or Firm* — Yao Legal Services, Inc.

(57) ABSTRACT

An apparatus in a first computing device is provided. During operation, the apparatus can present, to a processor of the first computing device, a virtual interface switch (VIS) coupled to an interface port of the processor. The apparatus can present to the processor that a target device, which is reachable via a remote apparatus of a second computing device, is coupled to the VIS. The apparatuses can be coupled via at least a first fabric and a second fabric. A respective fabric may facilitate communication based on a fabric switching protocol. The apparatus can obtain a set of packets, which can be issued from the interface port via the VIS and directed to the target device. The apparatus can then forward, to the remote apparatus, a first subset of the set of packets via the first fabric and a second subset of the set of packets via the second fabric.

20 Claims, 11 Drawing Sheets

(56) References Cited

U.S. PATENT DOCUMENTS

| | | | | |
|---|---|---|---|---|
| 2017/0064047 A1* | 3/2017 | Bosshart | ................. | H04L 69/22 |
| 2017/0177396 A1* | 6/2017 | Palermo | .............. | G06F 9/45558 |
| 2017/0295100 A1* | 10/2017 | Hira | ..................... | H04L 45/125 |
| 2019/0044812 A1* | 2/2019 | Loftus | ................. | H04L 41/0895 |
| 2020/0274828 A1* | 8/2020 | Alapati | ................. | H04L 49/356 |
| 2021/0092057 A1* | 3/2021 | Devireddy | .............. | H04L 45/54 |
| 2022/0060382 A1* | 2/2022 | McGraw | ................. | H04L 49/70 |

* cited by examiner

METHOD AND SYSTEM FOR FACILITATING HIGH AVAILABILITY IN A MULTI-FABRIC SYSTEM

BACKGROUND

Field

The present disclosure relates to fabric systems. More specifically, the present disclosure relates to a method and system for facilitating high availability in a multi-fabric system.

BRIEF DESCRIPTION OF THE FIGURES

In the figures, like reference numerals refer to the same figure elements.

DETAILED DESCRIPTION

Figure 1A:
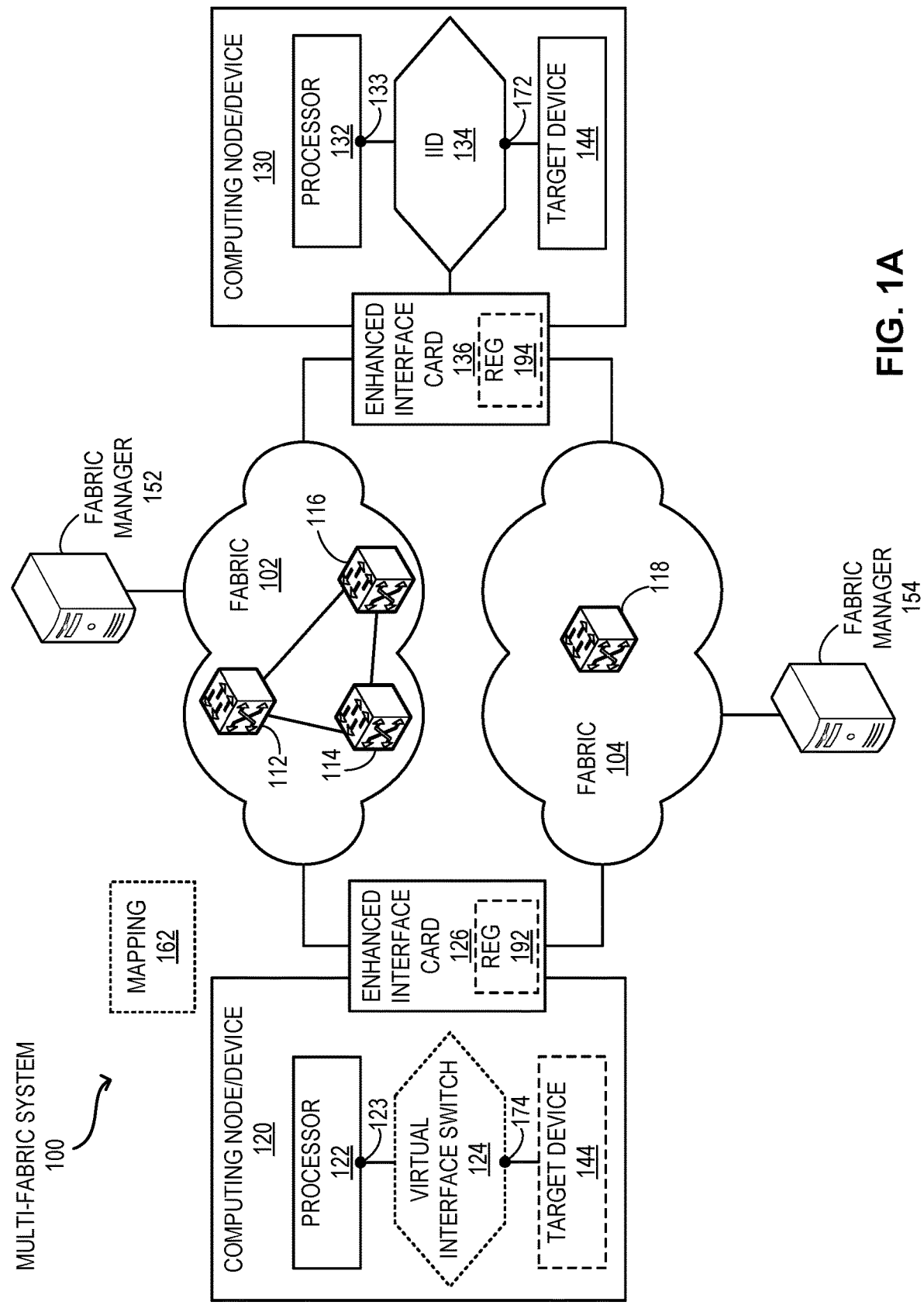
FIG. 1A illustrates an exemplary multi-fabric system facilitating high availability based on a virtual interface switch (VIS), in accordance with an embodiment of the present application.

The following description is presented to enable any person skilled in the art to make and use the technology, and is provided in the context of a particular application and its requirements. Various modifications to the disclosed embodiments will be readily apparent to those skilled in the art, and the general principles defined herein may be applied to other embodiments and applications without departing from the spirit and scope of the present technology. Thus, the present technology is not limited to the embodiments shown, but is to be accorded the widest scope consistent with the claims.

Overview

The Internet is the delivery medium for a variety of applications running on physical and virtual devices. Such applications have brought with them an increasing demand for efficient data access. As a result, equipment vendors race to build forwarding mechanisms, such as a fabric, for efficiently forwarding storage data. A compute node may issue a storage instruction (e.g., a read or a write instruction) that can be carried across the fabric and executed on a target node. In this way, the fabric can facilitate communication between compute nodes and storage nodes in a storage area network (SAN), such as a datacenter network. However, the fabric may need to establish communication among a large number of devices. As a result, if a failure occurs in the fabric, the communication among the devices coupled via the fabric may also fail.

One embodiment of the present technology provides an apparatus in a first computing device. The apparatus can include a virtual interface switch (VIS) logic block, a discovery logic block, and a forwarding logic block. The VIS logic block can present, to a processor of first the computing device, a VIS virtually coupled to an interface port of the processor. The discovery logic block can present to the processor that a target device is coupled to the VIS. The target device is reachable via a remote apparatus of a second computing device. The apparatus and the remote apparatus can be coupled via at least a first fabric and a second fabric. A respective fabric may include one or more switching devices facilitating communication based on a corresponding fabric switching protocol and can be managed by a fabric manager. The forwarding logic block can then obtain a set of packets, which can be issued from the interface port via the VIS and directed to the target device from the processor. Subsequently, forwarding logic block can forward, to the remote apparatus, a first subset of the set of packets via the first fabric and a second subset of the set of packets via the second fabric.

In a variation on this embodiment, the discovery logic block can determine that the processor has initiated a discovery process via the interface port and present the VIS to the discovery process based on information from one or more registers in the first interface card.

In a variation on this embodiment, the forwarding logic block can encapsulate a respective packet of the set of packets with a fabric header. The fabric header can include a set of identifiers corresponding to the apparatus and the remote apparatus.

In a further variation, the apparatus can also include a selection logic block that can select a forwarding fabric from the first and second fabrics for the encapsulated packet based on a selection policy.

In a further variation, the fabric header can be based on one or more of: a message header associated with identifier routing and a network encapsulation header associated with a networking protocol. For the message header, the set of identifiers can include an originator identifier of the apparatus and a target identifier of the remote apparatus. On the other hand, the networking protocol can be one or more of: an Ethernet protocol, an Internet Protocol (IP), a fabric protocol, and a Gen-Z protocol.

In a variation on this embodiment, the apparatus can include a communication logic block that can receive a second set of packets from the remote apparatus and order the second set of packets based on corresponding sequence numbers. A first subset of the second set of packets can be received via the first fabric and a second subset of the second set of packets can be received via the second fabric.

In a variation on this embodiment, the apparatus can also include a high availability logic block that can determine that the first fabric has become unavailable. The forwarding logic block can then resend unacknowledged packets in the first subset of the set of packets via the second fabric.

In a further variation, the high availability logic block can pause forwarding of subsequent packets via the first fabric if the first fabric has become unavailable. The forwarding logic block can then reallocate buffers associated with the first fabric to the second fabric.

In a variation on this embodiment, the VIS logic block can receive information associated with a second VIS presented by the remote apparatus. The target device can be bound to the second VIS, and the second VIS can be bound to the VIS presented by the VIS logic block of the apparatus.

In a variation on this embodiment, the discovery logic block can obtain binding information associated with the target device from the fabric manager. The apparatus can then include an abstraction logic block that can maintain a mapping between the virtual and physical bindings of the target device based on the binding information.

The embodiments described herein solve the problem of facilitating high availability in fabric-based communication by facilitating an enhanced interface card (EIC) capable of (i) coupling with a plurality of fabrics, (ii) presenting a virtual interface switch (VIS) to a processor of a computing device (or node) hosting the EIC, and (iii) presenting a respective device reachable via the plurality of fabrics as a device reachable via a VIS. In this way, the processor can determine a respective remote device as a local device coupled via a local interface switch (i.e., the VIS). This allows the EIC to obtain the packets issued from the processor via the VIS and distribute the packets across the plurality of fabrics.

With existing technologies, the processor of the compute node may determine that a remote target node is reachable via a single fabric because the standard interface-based instructions do no support multiple fabrics. For example, the processor may issue a packet via a peripheral component interconnect express (PCIe) port of the processor. For example, the packet can correspond to a read or write operation for a target device at a target node. However, the processor may be capable of determining that a target device of the instruction is reachable via a single PCIe fabric. A target device can be any device to which a packet can be issued. In other words, even if multiple fabrics may exist between two devices, the processor can identify a remote target device via one of the fabrics and may issue instructions only via that fabric.

Consequently, an interface card of a compute node typically does not use multiple fabrics to forward the packets to one target node. As a result, the fabric may become a single point of failure between the compute and target nodes. Even though some fabrics may manage a fault within the fabric (e.g., a connection failure within the fabric), the inaccessibility to the fabric may not be manageable from within the fabric. Hence, if the fabric becomes inaccessible or unavailable due to a node or link failure, the computing nodes (e.g., compute nodes and storage nodes in a SAN) coupled via the fabric can become disconnected and inaccessible to each other. Under such circumstances, the processor may not be able to access a target device in the target node.

To solve this problem, the EIC in a computing node can be equipped with a plurality of fabric ports, each for coupling a fabric. The EIC can be coupled to a plurality of fabrics via the fabric ports. The EIC can use at least two of the plurality of fabrics to send the packets from the processor of the computing node to remote target devices. To utilize multiple fabrics, the EIC can present a virtual interface switch (VIS) (e.g., a PCIe switch) to the processor of the computing node. The VIS can be presented within the computing node between the processor and the EIC. A respective fabric can be managed by a fabric manager, which can determine which target device is accessible from which processor via the fabric. To facilitate this, the fabric manager can determine the binding between a respective device and an interface port via which the device is accessible. The fabric manager can then provide the binding information to a respective EIC.

During the discovery process, the processor can determine the presence of a device by checking a respective interface port (or slot) of the processor. When the discovery process is initiated, the EIC can present the VIS to the processor, which can then discover that the VIS is coupled to the processor via an interface port of the processor. For example, if the interface port is a PCIe port, during the discovery process, the processor can enumerate a respective PCIe port for a respective function. The enumeration process can be initiated during the booting up process of the computing node by the firmware of the computing node or by the operating system of the computing node (e.g., based on a hotplug event). The EIC can then present the VIS as a virtual PCIe switch to the processor. Accordingly, the processor can determine that the VIS is coupled to the root port of the processor.

Subsequently, the EIC can determine a set of target devices (e.g., storage devices) in remote target nodes that should be accessible from the computing node via the fabrics based on the information from the respective fabric managers of the fabrics. The fabric manager can be a scalable management platform for configuring and administrating the fabric. The EIC can then present a respective target device in the target nodes as a storage device coupled to the VIS (i.e., bound to a virtual interface port of the VIS). As a result, based on the binding, the processor can issue a packet directed to the storage device via the VIS. The packet can be a read or write command based on PCIe or a compute express link (CXL). The EIC can support non-volatile memory express (NVMe), which can allow the processor to access the target device with the levels of parallelism supported by the target device. It should be noted that a packet can be based on the interfacing technology used to couple the target node. Consequently, the VIS can be a virtual interfacing device of the corresponding interfacing technology.

Since the EIC is the underlying physical device representing the VIS, the EIC can receive the packet and acknowledge the packet to the processor. As a result, the processor can determine that the packet has been delivered to the intended target device. The EIC can then take over the forwarding of the packet. The EIC can generate a fabric packet by encapsulating the packet with a fabric header and forward the encapsulated packet to the receiving EIC of the target node. The forwarding can be based on an identifier (ID) routing. The fabric header can include message IDs identifying the originator EIC and the receiving EIC as the source and destination devices, respectively. The originator EIC and the receiving EIC can have visibility of their respective buffers. As a result, the originator EIC may forward a packet via a fabric if a corresponding receiving buffer (i.e., the buffer allocated for receiving packets from the selected fabric) of the receiving EIC has room for a packet. In this way, the originator EIC may forward packets based on available credit (i.e., availability in the receiving buffer), thereby facilitating flow control.

In some embodiments, a fabric can be an interface switching fabric (e.g., a PCIe switching fabric) or a network fabric (e.g., a distributed fabric based on an Ethernet, Internet protocol (IP), Gen-Z, or Fibre Channel (FC)). The interface switching fabric may forward the packet based on the message IDs. If the interface switching fabric is based on PCIe, the message ID can include one or more of: a bus number, a device number, and a function number. The packet can then be a transaction layer packet (TLP). On the other hand, for the network fabric, the fabric header can be a network encapsulation header. The encapsulation header can include network addresses identifying the originator EIC and the receiving EIC as the source and destination devices, respectively. Examples of a network address can include, but are not limited to, a media access control (MAC) address, an IP address, a worldwide name (WWN), and an FC domain ID.

The EIC may receive a plurality of packets from the processor. The EIC can distribute the packets across at least two of the plurality of fabrics. The EIC can use a fabric selection policy to determine a forwarding fabric for a respective packet. Examples of a fabric selection policy include, but are not limited to, round-robin, interleaving, hash-based selection, load balancing across the fabrics, residual- or available-capacity-based selection, and forwarding-policy-based selection. In some embodiments, a user may configure a fabric selection policy for the EIC. The EIC may have a different fabric selection policy for each stream of packets (e.g., for individual target devices).

The receiving EIC can obtain the packets from multiple fabrics and order the packets (e.g., based on a sequence number in the fabric header of a respective packet). The receiving EIC can then deliver a respective packet to its intended target device via an interface interconnect device (IID) of the target node. Examples of the IID include, but are not limited to, a PCIe switch and a multi-function PCIe device. In some embodiments, receiving EIC can present a tier-2 VIS for a respective originator EIC. The VIS presented by the originator EIC can then become a tier-1 VIS. A respective tier-2 VIS can be bound to a corresponding tier-1 VIS. The processor of the originator node can determine that a respective target device is accessible from its interface port because the target device is bound a tier-2 VIS that is presented by the receiving EIC of the corresponding target node.

The EIC can maintain a timer for a respective packet. Upon receiving the packet, the receiving EIC may send an acknowledgment. If a fabric among the forwarding fabrics becomes unavailable, a packet forwarded via the fabric may not be delivered. Consequently, the EIC can determine that the packet has timed out. If a threshold number of packets are timed out, the EIC may determine that the fabric has become unavailable. The EIC may also obtain the failure information from the fabric manager of the fabric. The EIC can resend the timed-out packets via one or more available fabrics. To do so, the EIC may reallocate a respective buffer that has been allocated for the failed fabric to a selected fabric. Since the EIC has already acknowledged the instruction to the processor, the processor may remain oblivious to the recovery process. In this way, the EIC can facilitate high-availability in a multi-fabric system.

In this disclosure, the term "switch" is used in a generic sense, and it can refer to any standalone or fabric switch operating in any network layer. "Switch" should not be interpreted as limiting embodiments of the present technology to layer-2 networks. Any device that can forward traffic to an external device or another switch can be referred to as a "switch." Any physical or virtual device (e.g., a virtual machine/switch operating on a computing node) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting embodiments of the present technology to layer-3 networks. "Packet" can be replaced by other terminologies referring to a group of bits, such as "message," "frame," "cell," "datagram," or "transaction."

System Architecture

FIG. 1A illustrates an exemplary multi-fabric system facilitating high availability based on a VIS, in accordance with an embodiment of the present application. As illustrated in FIG. 1, a multi-fabric system (or environment) 100 can facilitate high availability in fabric-based communication. Fabrics 102 and 104 may couple computing nodes 120 and 130. Fabric managers 152 and 154 can manage fabrics 102 and 104, respectively. Fabric managers 152 and 154 can be scalable management platforms for configuring and administrating fabrics 152 an 154, respectively. In this example, fabric 102 can be a multi-hop fabric, such as multi-switch network fabric based on an Ethernet, IP, Gen-Z, or FC, or a multi-hop PICe fabric. Fabric 102 can include network switches (or PCIe switches) 112, 114, and 116. On the other hand, fabric 104 can be a single-hop fabric, such as an interface switching fabric based on a PCIe switching fabric. Fabric 104 can include a PCIe switch bay 118 (e.g., a multi-channel switching bay based on PCIe).

With existing technologies, processor 122 of computing node 120 may determine that a target device 144 is accessible via an interface port (or slot) 123. Here, nodes 120 and 130 can be a compute node and a storage node, respectively. Processor 122 may issue packets via interface port (or slot) 123 of processor 122. Target device 144 can be a storage device, such as a solid-state device (SSD), in node 130. Target device 144 can be coupled to an IID 134 in node 130. Processor 132 of node 130 can be coupled to IID 134 via an interface port 133 of processor 132. The packet from processor 122 can be associated with a read or a write operation to be executed on target device 144. However, because the standard interface-based communication does not support multiple fabrics, packets sent from processor 122 to target device 144 cannot utilize multiple fabrics 102 and 104.

In other words, even if multiple fabrics 102 and 104 may exist between nodes 120 and 130. Consequently, node 120 may use fabric 104 to forward packets to node 130 without using fabric 102. As a result, fabric 104 may become a single point of failure between nodes 120 and 130. Even though fabric 104 may manage a fault within fabric 104, the inaccessibility to fabric 104 may not be manageable from within fabric 104. Hence, if fabric 104 becomes inaccessible or unavailable due to a node or link failure, nodes 120 and 130 may become disconnected and inaccessible to each other. Under such circumstances, processor 122 may not be able to access target device 144 in node 130.

To solve this problem, nodes 120 and 130 can be equipped with EICs 126 and 136, respectively. Each of EICs 126 and 136 can include a plurality of fabric ports. A respective fabric port can be capable of coupling a fabric. EICs 126 and 136 can be coupled to both fabrics 102 and 104 via their respective fabric ports. This allows EIC 126 to use both fabrics 102 and 104 to send packets to node 130. The packets can be issued from processor 122. To utilize fabrics 102 and 104 while forwarding packets from processor 122, EIC 126 can present a VIS 124 (e.g., a virtual PCIe switch) to processor 122. VIS 124 can be presented within node 120 between processor 122 and EIC 126.

In some embodiments, EIC 126 can be equipped with a set of registers 192 that can store information associated with VIS 124. EIC 126 can present VIS 124 to processor 122 using information from registers 192. Similarly, EIC 136 can be equipped with a set of registers 194 that can store information associated with a VIS. A respective fabric can be managed by a corresponding fabric manager. For example, fabrics 102 and 104 can be managed by fabric managers 152 and 154, respectively. A fabric manager, such as fabric manager 152, can determine whether target device 144 is accessible from processor 122 via fabric 102. To facilitate this, fabric manager 152 can determine the binding between a respective device and an interface port via which the device is accessible. Fabric manager 152 can then provide the binding information to EICs 126 and 136.

During the device discovery process, processor 122 can determine the presence of an interfacing device by checking a respective interface port (or slot) of processor 122. A port can be for an attachable device, and a slot can be for an embedded device. For example, if the interface ports are PCIe slots, during the discovery process, processor 122 can enumerate a respective PCIe slot, such as slot 123, for a respective function. The enumeration process can be initiated during the booting up process of node 120 by the firmware of node 120 or by the operating system of node 120. When the discovery process is initiated, EIC 126 can present VIS 124 to processor 122 by providing virtual device information (e.g., a virtual device identifier of VIS 124) from registers 192 via port 123. Processor 122 can then discover that VIS 124 is coupled to processor 122 via port 123, which in this example can be the root port of processor 122.

Subsequently, EIC 126 can identify a respective target device that should be accessible from node 120 via fabrics 102 and 104 based on the information from fabric managers 152 and 154. For example, EIC 126 can identify target device 144, which can be a storage device, such as an SSD, in node 130. EIC 126 can then present target device 144 as a storage device coupled to VIS 124 (i.e., target device 144 becomes bound to the corresponding virtual interface port of VIS 124). As a result, processor 122 can issue a packet directed to storage device 144 via port 123 toward VIS 124. The packet can be associated with a read or write command based on PCIe or CXL. Accordingly, VIS 124 can be a virtual interfacing device of the corresponding interfacing technology.

To facilitate the presentation of VIS 124, EIC 126 can maintain a mapping 162 that maps a respective binding (or association) between a target device and IID 134 to a corresponding binding between that target device and VIS 124. For example, since target device 144 is coupled to an interface port 172 of IID 134, EIC 126 can bind target device 144 to a virtual interface port 174 of VIS 124. Accordingly, mapping 162 can include a mapping between the corresponding bindings. This allows EIC 126 to determine that if a packet is obtained based on virtual interface port 174, the binding corresponds to interface port 172. In this way, based on mapping 162, EIC 126 can determine any packet issued to target device 144. During the initialization of fabrics 102 and 104, fabric managers 152 and 154 can discover the devices and provide the physical binding information to EICs 126 and 136. Based on the physical binding information, EICs 126 and 136 can generate the corresponding mappings.

Since EIC 126 is the underlying physical device representing VIS 124, EIC 126 can receive the packet and issue an acknowledgment for the packet to processor 122. As a result, processor 122 can determine that the packet has been delivered to target device 144. EIC 126 can then take over the forwarding of the packet. EIC 126 can select one of fabrics 102 and 104 for the packet, and forward the packet to EIC 136 via the selected fabric. For another packet, EIC can select another fabric. In this way, EIC 126 can use both fabrics 102 and 104 for forwarding packets (e.g., based on ID routing). EIC 136 can obtain the packets from fabrics 102 and 104, order the packets, and provide the packets to target device 144 via IID 134.

EICs 126 and 136 can have visibility of their respective buffers. As a result, EIC 126 may forward a packet via fabric 102 if a corresponding receiving buffer (i.e., the buffer allocated for receiving packets from fabric 102) of EIC 136 has room for a packet. In this way, EIC 126 may forward packets based on available credit (i.e., availability in the receiving buffer), thereby facilitating flow control between EICs 126 and 136. If fabric 102 becomes unavailable due to a failure, some of the packets sent via fabric 102 can be lost. EIC 126 can detect the unavailability (e.g., either based on missed packets or from fabric manager 152). EIC 126 can then determine the sending buffers allocate for fabric 102 and reallocate the sending buffers to fabric 104. Subsequently, EIC 126 can resend the lost packet via fabric 104 from the reallocated sending buffers. In this way, EIC 126 can facilitate high availability in multi-fabric system 100 by forwarding packets using multiple fabrics. Furthermore, by presenting VIS 124 to processor 122, EIC 126 can ensure the failure and recovery process for fabric 102 remains opaque to processor 122.

Figure 1B:
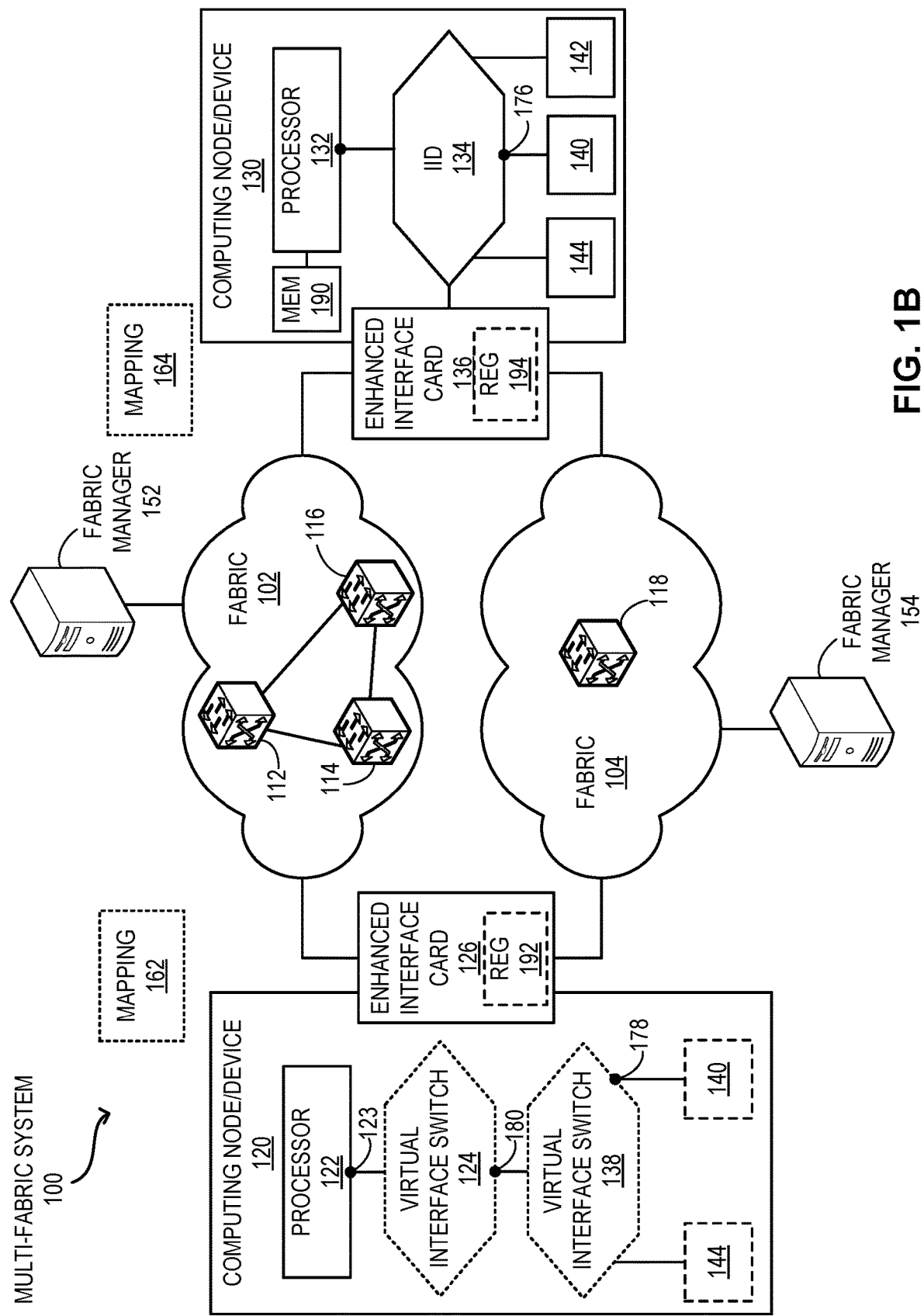
FIG. 1B illustrates an exemplary multi-fabric system facilitating high availability based on multi-tier VISs, in accordance with an embodiment of the present application.

If a node is a storage node, the node can include a plurality of target devices (e.g., storage devices). These target devices may be coupled to an IID of the node. FIG. 1B illustrates an exemplary multi-fabric system facilitating high availability based on multi-tier VISs, in accordance with an embodiment of the present application. Node 130 can include a plurality of target devices 144, 140, and 142 coupled to IID 134. Examples of IID 134 include, but are not limited to, a PCIe switch and a multi-function PCIe device. IID 134 may also represent the target devices presenting logical resources via memory 190 of target node 130 memory space using processor 132. Examples of such representation can include, but are not limited to, storage devices presenting logical volumes, virtual and physical functions of PCIe co-packaged devices, and smart interfacing devices presenting functionalities using memory 190. Smart interfacing devices may present virtual and physical functions based on PCIe single root input/output virtualization (SR-IOV) specification, input/output (TO) queue pairs, and memory expansion based on CXL memory devices. Physical device support in EIC 136 can include support for NVMe, which can allow processor 122 to access target device 144 with the levels of parallelism supported by target device 144.

EIC 136 can obtain packets, which are from multiple fabrics and destined to different target devices. EIC 136 can then deliver a respective packet to its intended target device (e.g., from 140, 142, and 144) via IID 134 in node 130. Examples of IID 134 include, but are not limited to, a PCIe switch and a multi-function PCIe device. In some embodiments, EIC 136 can present a tier-2 VIS for a respective originator EIC. For example, EIC 136 can present a tier-2

VIS 138 for EIC 126. It should be noted that EIC 136 can present a separate tier-2 VIS to each originator EIC. VIS 126 can then become a tier-1 VIS. VIS 138 can be bound to a virtual port 180 of VIS 126. Processor 122 can determine that a respective target device is accessible via port 123 because it is virtually coupled to tier-2 VIS 138. Registers 194 of EIC 136 can store information associated with VIS 138. EIC 136 can present VIS 138 using information from registers 194. Since EIC 136 manages VIS 138, any packet directed to VIS 138 is forwarded to EIC 136.

To facilitate the presentation of VIS 138, EIC 136 can maintain a mapping 164 that maps a respective binding (or association) between a target device and IID 134 to a corresponding binding between that target device and VIS 138. In this way, mapping 164 can facilitate a hardware abstraction layer. For example, since target device 140 is coupled to an interface port 176 of IID 134, EIC 136 can bind target device 140 to a virtual interface port 178 of VIS 138. Accordingly, mapping 164 can include a mapping between the corresponding bindings. This allows EIC 136 to determine that if a packet is directed to virtual interface port 178, the binding corresponds to physical interface port 176 of IID 134. In this way, based on mapping 164, EIC 136 can determine any packet issued to target device 140. Mapping 164 allows EIC 136 to receive a packet based on the virtual binding of target device 144 and deliver the packet to target device 144 based on the physical binding with IID 134.

In the same way, mapping 164 can include a mapping between the bindings associated with target device 144. Furthermore, based on the binding, mapping 162 of EIC 126 can include a mapping indicating that both target devices 140 and 144 are bound to virtual interface port 180 of VIS 124. Hence, EIC 124 can maintain connectivity information of target devices 140 and 144 using the same binding. In this example, each of processors 122 and 132, and fabric managers 152 and 154 may present a distinct, independent, and isolated address domain. However, EICs 126 and 136 can provide address domain isolation and abstraction rules for binding disaggregated memory addressed resources across a fabric based on mappings 162 and 164. Furthermore, EICs 126 and 136 may facilitate backward compatibility and compliance with corresponding interfacing technology (e.g., PCIe) with self-directed fabric failover and quality of service (QoS).

A respective target device of node 130 can be accessible by one or more remote nodes, such as node 120. Suppose that node 120 is configured to access target devices 144 and 140. Fabric managers 152 and 154 can identify a respective target device that should be accessible from node 120 via fabrics 102 and 104. For example, fabric managers 152 and 154 can identify target devices 144 and 140 in node 130. Accordingly, fabric managers 152 and 154 can bind target devices 144 and 140 to virtual interface ports of VIS 138. Therefore, processor 122 can determine that target devices 144 and 140 are accessible via interface port 123, and issue packets to these devices via interface port 123. Since target device 142 may not be accessible from node 120, fabric managers 152 and 154 can be precluded from presenting target device 142 to processor 122. Hence, EIC 126 and processor 122 may not be aware of the presence of target device 142.

To perform an operation on device 140, processor 122 can then issue a packet to device 140 via interface port 123. Since EIC 126 is the underlying physical device representing VIS 124, EIC 126 can receive any packet sent via interface port 123. EIC 126 can determine that the packet is directed to target device 140, which is bound to VIS 138. Since EIC 136 is the underlying physical device representing VIS 138, EIC 126 can select a fabric from fabrics 102 and 104, and forward the packet to EIC 136 via the selected fabric. EIC 136 can obtain the packets from the selected fabric and determine that target device 140 is bound to VIS 138. EIC 136 can then obtain the physical binding from mapping 164 and determine that target device 140 is coupled to IID 134 via interface port 176. EIC 136 can provide the packet to target device 140 via IID 134. Alternatively, EIC 136 may provide the packet to processor 132. Processor 132 can determine which target device the packet is directed to and forward the packet to target device 140.

Figure 2:
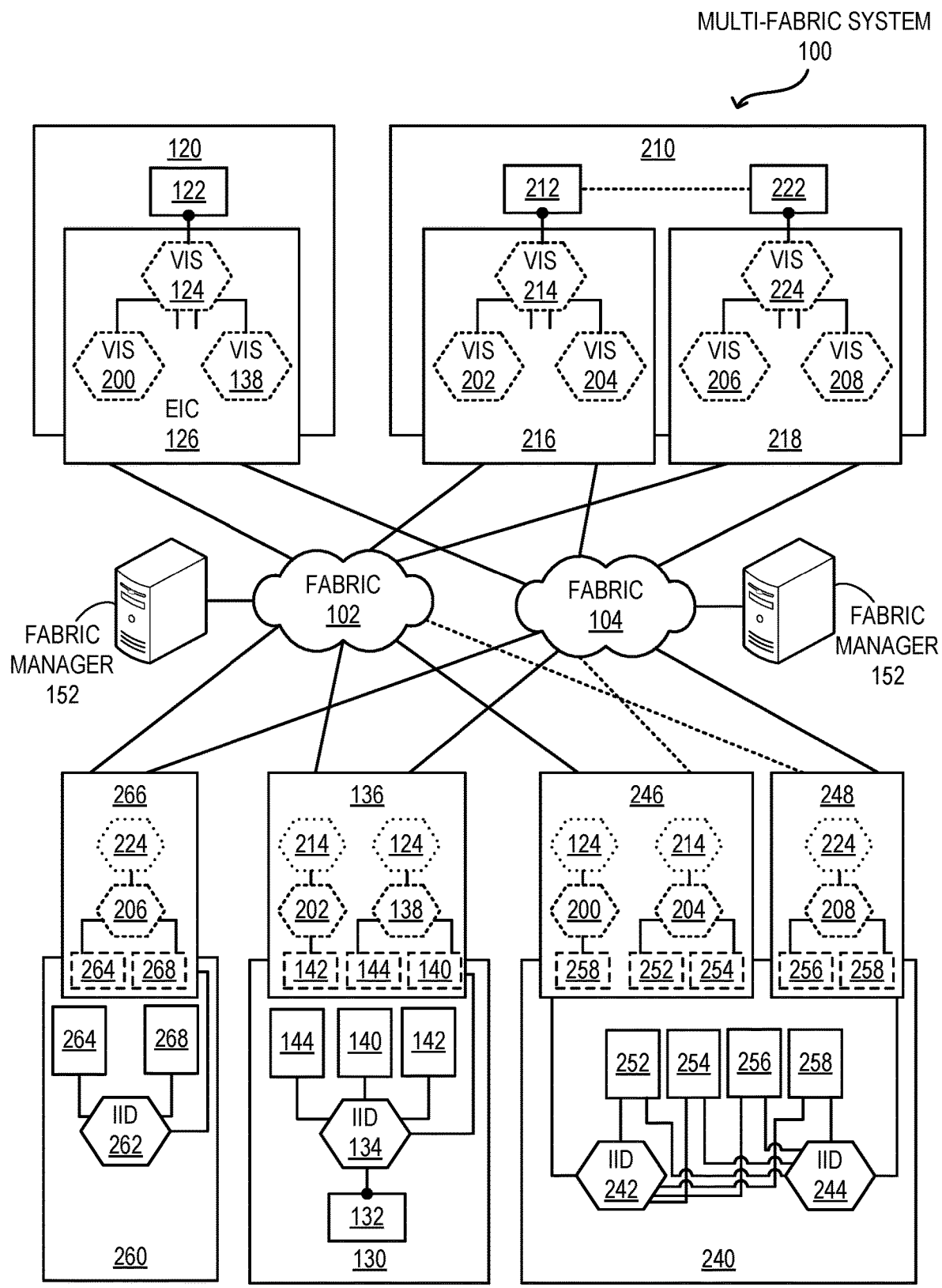
FIG. 2 illustrates exemplary connectivity among devices via a multi-fabric system, in accordance with an embodiment of the present application.

FIG. 2 illustrates exemplary connectivity among devices via a multi-fabric system, in accordance with an embodiment of the present application. Fabrics 102 and 104 can be coupled to nodes 120, 130, 210, 240, and 260. Each of nodes 120, 130, 210, and 260 can be coupled to both fabrics 102 and 104 using at least one EIC. In this example, nodes 120 and 210 can be compute nodes, and nodes 130, 240, and 260 can be storage nodes. Node 210 can include processors 212 and 222, and can include EICs 216 and 218. Each of EICs 216 and 218 can be coupled to both fabrics 102 and 104. Here, processors 212 and 222 can be different processors (e.g., a central processor, an accelerator, a specialized processing unit, etc.) in a multi-processor system or different cores in a multi-core processing unit (denoted with a dotted line). Nodes 240 and 260 can be storage bays and may not include a processing unit.

Node 260 can be coupled to fabrics 102 and 104 via EIC 266. Node 260 can include a plurality of target devices 264 and 268 coupled to IID 262. On the other hand, node 240 can include two EICs 246 and 248, coupling fabrics 102 and 104, respectively. EICs 246 and 248 may also be coupled to fabrics 104 and 102, respectively, to facilitate high availability (denoted with dotted lines). Here, the links between EICs 246 and 248 and fabrics 102 and 104, respectively, can be active. The links between EICs 246 and 248 and fabrics 104 and 102, respectively, can remain in a standby mode and may not actively forward traffic. If EIC 246 or 248 becomes unavailable, a respective target device in node 240 may still remain accessible via the available EIC. The available EIC can then enable its standby link, thereby establishing connections with both fabrics 102 and 104 for facilitating high availability.

Node 240 can include a plurality of target devices 252, 254, 256, and 258 coupled to IIDs 242 and 244. Therefore, these target devices can be coupled to multiple IIDs in node 240 (e.g., based on NVMe specification). In node 240, even if each of EICs 246 and 248 can be coupled to a single fabric, node 240 can still be coupled to both fabrics 102 and 104 via EICs 246 and 248, respectively. Furthermore, IIDs 242 and 244 can be accessible from EICs 246 and 248, respectively. However, since the target devices in node 240 are coupled to both Ds 242 and 244, each of EICs 246 and 248 can access each target device in node 240. If IID 242 or 244 becomes unavailable, a respective target device in node 240 may still remain accessible via the available IDD.

In node 210, EICs 216 and 218 can be configured to operate based on instructions issued from processors 212 and 222, respectively. To utilize fabrics 102 and 104 while forwarding packets from processors 212 and 222, EIC 216 can present a VIS 214 to processor 212, and EIC 218 can present a VIS 224 to processor 222. However, if processors 212 and 222 are connected with each other (e.g., cores in a multi-core processing unit), processors 212 and 222 can issue packets to EICs 218 and 216, respectively, as well. Consequently, VIS 214 is accessible from processor 222, and VIS 224 is accessible from processor 212 as well. VIS 214 and VIS 224 can be presented within node 210. A respective VIS allows the corresponding EIC to receive packets, acknowledge the packets to the issuing processor, and take over subsequent forwarding of packets via multiple fabrics.

In this example, node 120 can be configured to access target device 258. Accordingly, based on the binding information from fabric managers 152 and 154, EIC 246 can present a tier-2 VIS 200 bound to VIS 124. Target device 258 can then be bound to VIS 200. In this way, VIS 200 can be virtually coupled to VIS 124, and target device 258 can be virtually coupled to VIS 200. EIC 246 can maintain a mapping that maps the virtual bindings of target device 258 to its physical binding to IID 242. The mapping allows EIC 246 to receive a packet based on the virtual binding from EIC 126 and deliver the packet to target device 258 based on the physical binding.

Similarly, node 210 can be configured to access target devices 264 and 268 via processor 222. Accordingly, based on the binding information from fabric managers 152 and 154, EIC 266 can present a tier-2 VIS 206 bound to VIS 224. Target devices 264 and 268 can then be bound to VIS 206. In this way, VIS 206 can be virtually coupled to VIS 224, and target devices 264 and 268 can be virtually coupled to VIS 206. EIC 266 can maintain a mapping that maps the virtual bindings of target devices 264 and 268 to their physical bindings to IID 262. The mapping allows EIC 266 to receive a packet based on the virtual binding from EIC 218 and deliver the packet to the intended target device based on the physical binding.

Node 210 can also be configured to access target device 142 via processor 212. Accordingly, based on the binding information from fabric managers 152 and 154, EIC 136 can present a tier-2 VIS 202 bound to VIS 214. Target device 142 can then be bound to VIS 202. In this way, VIS 202 can be virtually coupled to VIS 214, and target device 144 can be virtually coupled to VIS 202. EIC 136 can maintain a mapping that maps the virtual bindings of target device 142 to the physical binding to IID 134. EIC 136 can maintain a mapping (e.g., mapping 164 in FIG. 1B) that maps the virtual bindings of target device 142 to its physical binding to IID 134. The mapping allows EIC 136 to receive a packet based on the virtual binding from EIC 216 and deliver the packet to target device 142 based on the physical binding.

Similarly, node 210 can be configured to access target devices 252 and 254 via processor 212, and target devices 256 and 258 via processor 222. Accordingly, based on the binding information from fabric managers 152 and 154, EIC 246 can present a tier-2 VIS 204 bound to VIS 214, and EIC 248 can present a tier-2 VIS 208 bound to VIS 224. Target devices 252 and 254 can then be bound to VIS 204, and target devices 256 and 258 can be bound to VIS 208. In this way, VISs 204 and 208 can be virtually coupled to VISs 214 and 224, respectively. Moreover, target devices 252 and 254 can be virtually coupled to VIS 204, and target devices 256 and 258 can be virtually coupled to VIS 208. EIC 246 can maintain a mapping that maps the virtual bindings of target devices 252 and 254 to the physical bindings to IID 242. On the other hand, EIC 248 can maintain a mapping that maps the virtual bindings of target devices 256 and 258 to the physical bindings to IID 244.

Figure 3A:
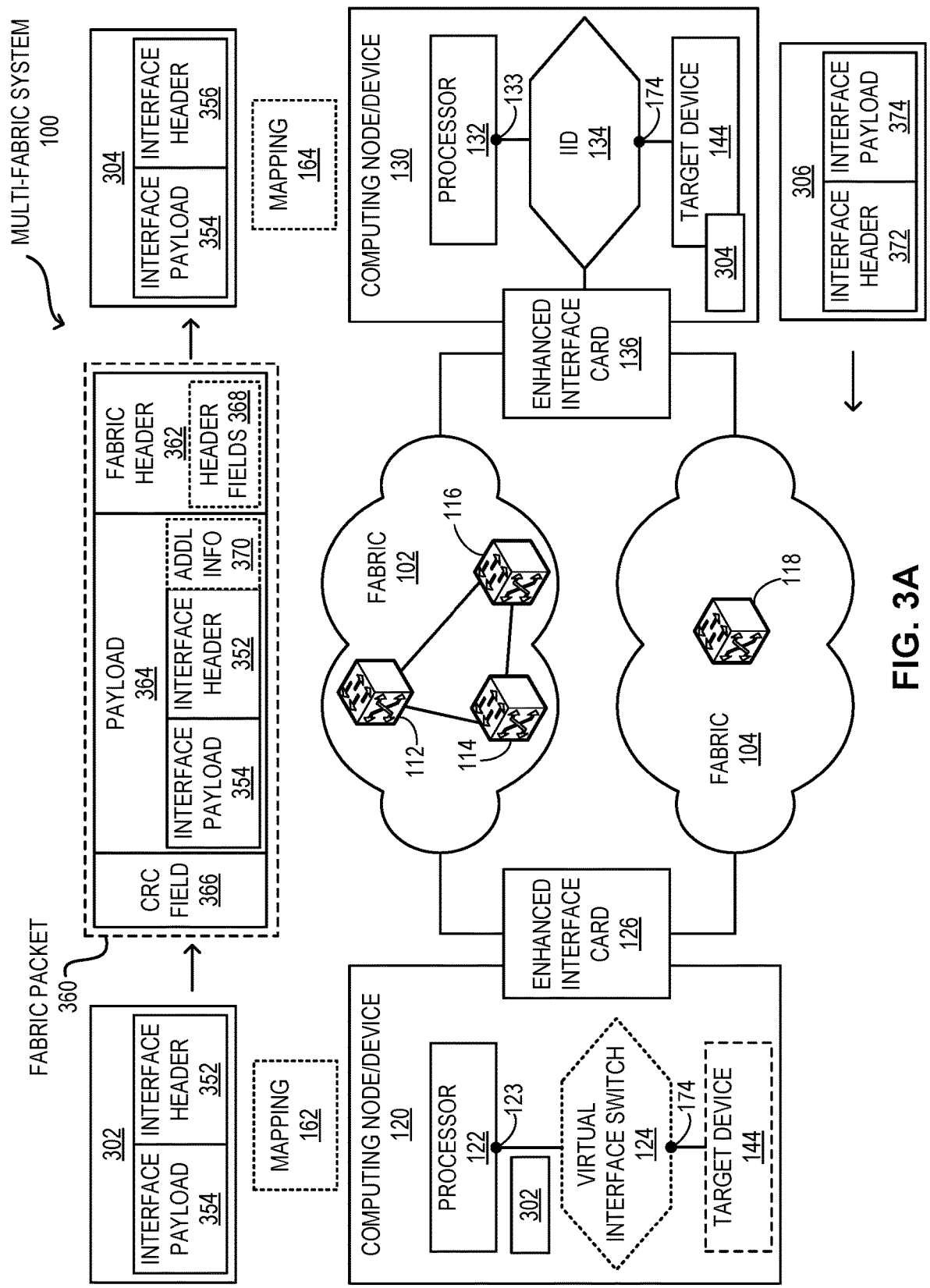
FIG. 3A illustrates exemplary packet encapsulation in a multi-fabric system, in accordance with an embodiment of the present application.

FIG. 3A illustrates exemplary packet encapsulation in a multi-fabric system, in accordance with an embodiment of the present application. During operation, processor 122 can issue a packet 302 directed to target device 144. EIC 126 can obtain packet 302 and may acknowledge the receipt of packet 302 to processor 122. Since the packet delivery is guaranteed from EIC 126 to EIC 136 (e.g., based on TLP/link-level acknowledgement), processor 122 can determine that packet 302 has been delivered to target device 144 and proceed accordingly. EIC 126 can then take over the forwarding of packet 302. Packet 302 can include an interface header 352 and an interface payload 354. For example, if the packets are generated based on PCIe, header 352 and payload 354 can be PCIe header and payload, respectively.

Similarly, EIC 136 can also send a packet 306 (e.g., for read completion originating from target device 144 or exchanging control information) to EIC 126. Packet 306 can include an interface header 372 and an interface payload 374. In this way, packets can originate in any direction between the respective EICs of compute and target nodes. The packets are then forwarded across fabrics 102 and 104, in either direction, based on corresponding fabric headers (and additional attributes, if needed). In this example, packet 302 can be issued for target device 144. Consequently, EIC 126 can determine that packet 302 is obtained based on virtual interface port 174. Based on mapping 162, EIC 126 can identify that the binding corresponds to interface port 172. In this way, EIC 126 can determine that packets issued to target device 144 should be forwarded to EIC 136.

EIC 126 can generate a fabric packet 360 (e.g., a TLP packet) by encapsulating packet 302 with fabric encapsulation. EIC 126 can then select a forwarding fabric from fabric 102 or 104 for forwarding packet 360. EICs 126 and 136 can have visibility of each other's buffers. As a result, EIC 126 may forward packet 302 via the forwarding fabric if a buffer of EIC 136 that is allocated for receiving packets from the forwarding fabric has room for packet 302. Based on a credit-based flow control technique (e.g., configured for the bindings in EIC 126), EIC 126 may schedule and forward packets based on available credits in EIC 136. The available credits can indicate the availability in the receiving buffer of EIC 136. In this way, EIC 126 can forward packet 302 based on the availability of credits (i.e., receiving buffer space) in EIC 136, thereby facilitating flow control while forwarding packets.

Fabric encapsulation can include encapsulating packet 302 with a fabric header 362 and adding a cyclic redundancy check (CRC) field 366 to the packet. Packet 302 can then become a payload 364 of packet 360 (e.g., interface header 352 and interface payload 354 can become payload 364). If the forwarding fabric supports ID routing, fabric header 362 can be a message header. Fabric header 362 can then include header fields 368, which can include message IDs identifying EICs 126 and 136 as the source and destination EICs, respectively. Therefore, these message IDs can be the requester ID and the target ID, respectively (e.g., using PCIe interconnect as a fabric). Header fields 368 can also include one or more of: a vendor ID, flow control credits, transaction ordering requirement (e.g., strict or relaxed ordering), and a sequence number. EIC 126 can then forward packet 360 to EIC 136 based on ID routing via the selected forwarding fabric.

On the other hand, if the forwarding fabric is a network fabric, fabric header 362 can be a network header. Header fields 368 can then include corresponding network addresses identifying EICs 126 and 136 as the source and destination EICs, respectively. Examples of a network address can include, but are not limited to, a MAC address, an IP address, a WWN, and an FC domain ID. If the fabric encapsulation is based on Ethernet, fabric header 362 can be an Ethernet header. Header fields 368 can then include MAC addresses of EICs 126 and 136 as source and destination MAC addresses, respectively. Furthermore, CRC field 366 can then be part of fabric header 362. In addition, EIC 126 may include additional information 370 in payload 364. Additional information 370 can carry the vendor ID, flow control credits, transaction ordering requirement, and the sequence number.

EIC 126 can use a fabric selection policy to determine a forwarding fabric for packet 360. If EIC 126 selects fabric 104, EIC 126 can forward packet 360 via fabric 104 based on fabric header 362. Since fabric 104 can be an interface switching fabric, such as a PCIe switching fabric, fabric 104 can use header fields 368 to forward packet 360 via fabric 104 (e.g., based on ID routing on a TLP packet). On the other hand, if EIC 126 selects fabric 102, which can be a network fabric, fabric header 362 can be a network header. Accordingly, EIC 126 can encapsulate packet 302 using a network header to generate packet 360. Fabric 102 can then use header fields 368 to forward packet 360 via fabric 104 based on the forwarding mechanism of the network fabric.

Upon receiving packet 360, EIC 136 determine the virtual binding of target device 144, which is directed to virtual interface port 174, from header fields 368 (and additional information 370). EIC 136 can then utilize the hardware abstraction layer facilitated by mapping 164 to determine that, since packet 302 is directed to virtual interface port 174, the binding corresponds to physical interface port 172 of IID 134. EIC 136 can then decapsulate the fabric encapsulation to retrieve packet 302. EIC 136 can then update interface header 352 with the physical binding, and generate interface header 356. Subsequently, EIC 136 can generate packet 304 by replacing interface header 352 with interface header 356 and deliver packet 304 to target device 144 via interface port 172.

Figure 3B:
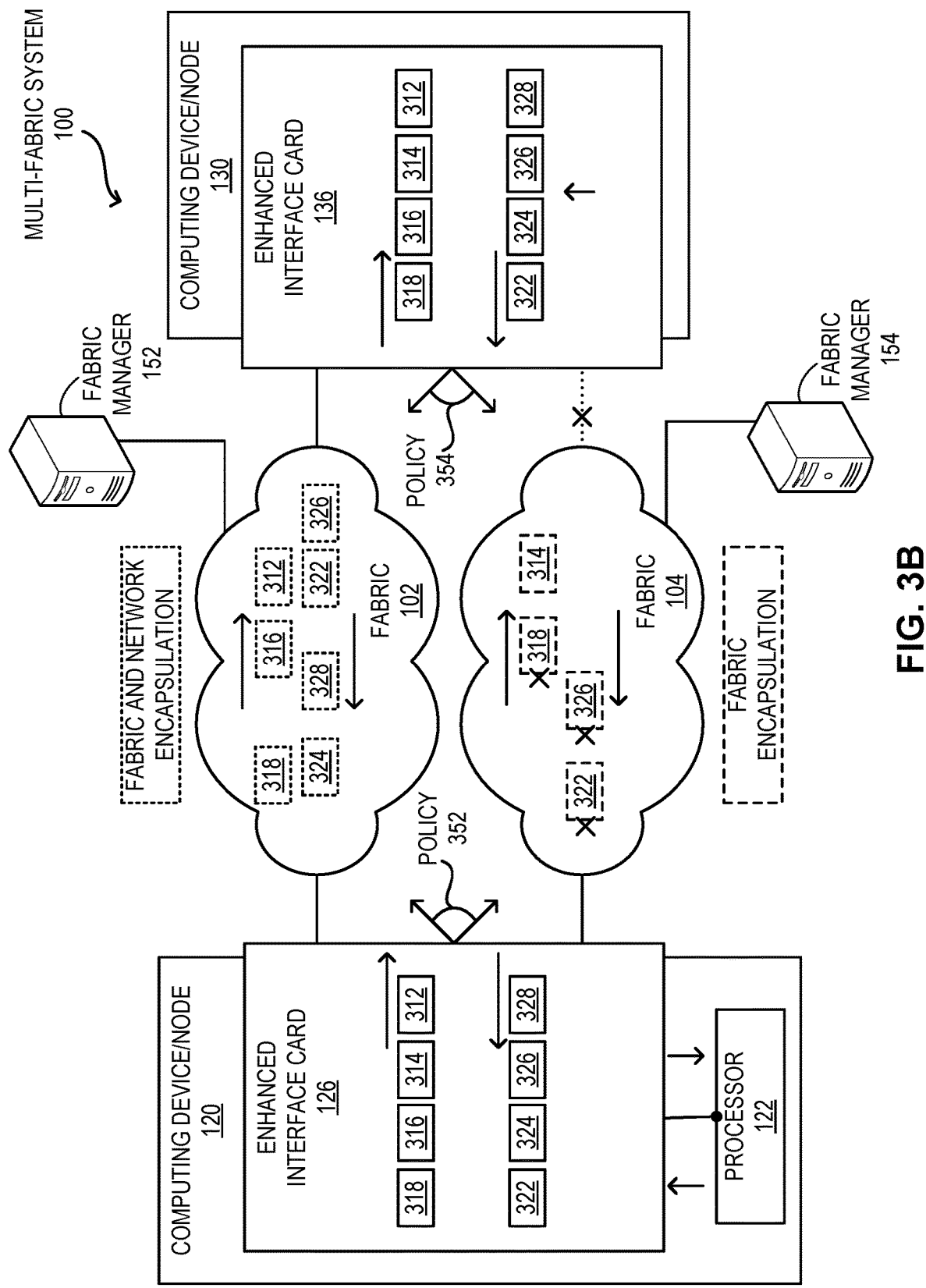
FIG. 3B illustrates an exemplary process of facilitating high availability in a multi-fabric system, in accordance with an embodiment of the present application.

FIG. 3B illustrates an exemplary process of facilitating high availability in a multi-fabric system, in accordance with an embodiment of the present application. During operation, processor 122 can issue a stream of packets 312, 314, 316, and 318. EIC 126 can distribute packets 312, 314, 316, and 318 across fabrics 102 and 104. EIC 126 can use a fabric selection policy 352 to determine a forwarding fabric for a respective packet. Examples of policy 352 include, but are not limited to, round-robin, interleaving, load balancing across fabrics 102 and 104, residual- or available-capacity-based selection, and forwarding-policy-based selection. In some embodiments, a user may configure policy 352 for EIC 126. EIC 126 may have a different fabric selection policy for each stream of packets.

Based on policy 352, EIC 126 can forward packets 312 and 316 via fabric 102 based on network encapsulation (denoted with dotted lines), and packets 314 and 318 via fabric 104 based on fabric encapsulation (denoted with dashed lines). Similarly, EIC 136 can send a plurality of packets 322, 324, 326, and 328 to EIC 126. EIC 136 can distribute packets 322, 324, 326, and 328 across fabrics 102 and 104 by determining a fabric selection policy 354 to determine a forwarding fabric for a respective packet. Policies 352 and 354 can be the same as or distinct from each other. Based on policy 354, EIC 136 can forward packets 312 and 316 via fabric 102, and packets 314 and 318 via fabric 104.

EIC 126 (and EIC 136) can maintain a timer for a respective packet, such as packet 312. Upon receiving packet 312 from EIC 126, EIC 136 may send an acknowledgment to EIC 126. The acknowledgment can be piggybacked on an outgoing packet from EIC 136 or can be a specialized packet for carrying the acknowledgment. If fabric 104 becomes unavailable (denoted with a cross), packet 318, which is forwarded via fabric 104, may not be delivered. The unavailability can be due to a link or a node failure, or to accommodate a scheduled event. Consequently, EIC 126 can determine that packet 318 has timed out. If a threshold number of packets are timed out, EIC 126 may determine that fabric 104 has become unavailable.

EIC 126 may also obtain the unavailability information from fabric manager 154. For example, fabric manager 154 may initiate a scheduled event, such as a forwarding update or a hotplug request to clear a fabric path. Upon determining that packet 318 that has been sent via fabric 104 has timed out, EIC 126 may obtain updated binding information from fabric manager 152. EIC 126 may reallocate a respective buffer that has been allocated for fabric 104 to fabric 102. Upon determining available credit for fabric 102 at EIC 136, EIC 126 can resend packet 318 via fabric 102 from the reallocated buffer.

If fabric 104 becomes unavailable, packets 322 and 326 can be lost as well. Consequently, EIC 136 can determine that packets 322 and 326 have timed out. Accordingly, EIC 126 can resend the timed-out packet 318 via fabric 102 based on available credits at EIC 136. Similarly, EIC 136 can resend the timed-out packets 322 and 326 via fabric 102 based on available credits at EIC 126. Furthermore, EICs 126 and 136 can pause the forwarding of subsequent packets via fabric 104 upon determining the unavailability. EICs 126 and 136 may resume packet forwarding via fabric 104 when fabric 104 recovers and becomes available. As described above, EICs 126 and 136 may obtain recovery information associated with fabric 104 from fabric manager 154.

Hence, even though packets 318, 322, and 326 are lost in fabric 104, these packets are still delivered to their respective destinations via fabric 102. EIC 136 can then still receive each of packets 312, 314, 316, and 318. Based on the sequence numbers in these packets, EIC 136 can reorder these packets. EIC 136 can then deliver packets 312, 314, 316, and 318 to their respective target devices. Similarly, EIC 126 can receive each of packets 322, 324, 326, and 328. Based on the sequence numbers in these packets, EIC 126 can reorder these packets and process them accordingly. In this way, multi-fabric system 100 can facilitate high availability by retransmitting lost packets in an unavailable fabric based on another available fabric with self-directed fabric failover in the EICs.

Operations

Figure 4A:
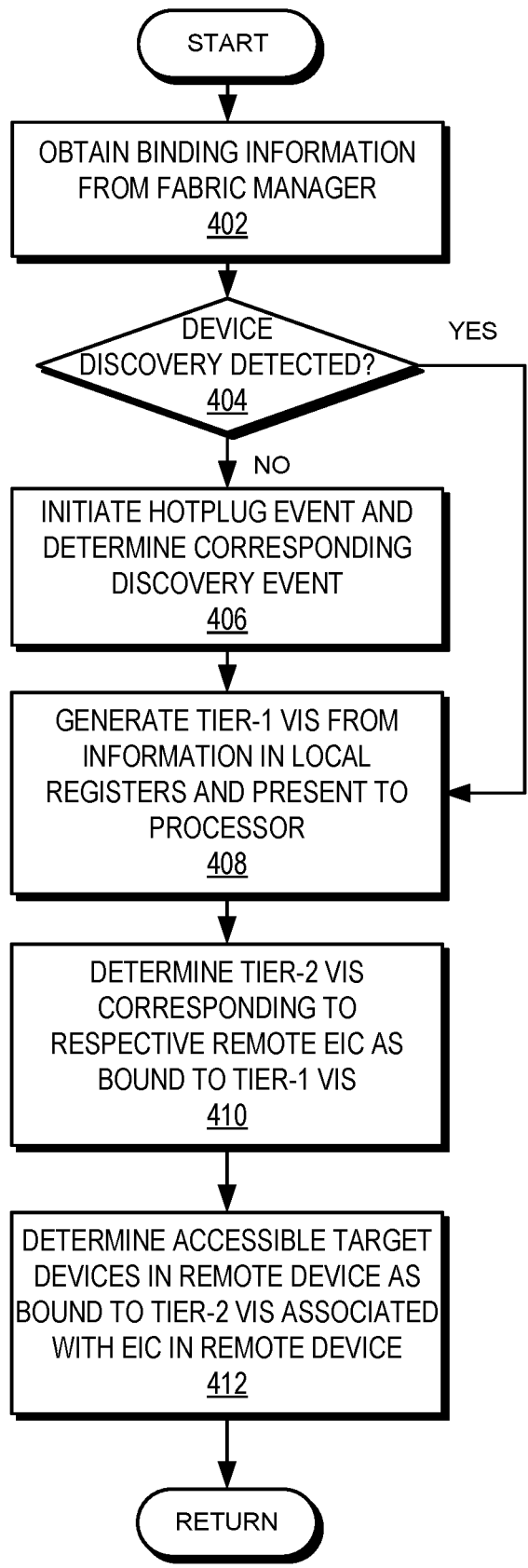
FIG. 4A presents a flowchart illustrating the VIS discovery process of a host in a multi-fabric system, in accordance with an embodiment of the present application.

FIG. 4A presents a flowchart illustrating the VIS discovery process of a host in a multi-fabric system, in accordance with an embodiment of the present application. During operation, an EIC in a computing node coupled to a fabric of the multi-fabric system can obtain the binding information from the fabric manager (operation 402). The EIC can then determine whether the discovery process of the processor of the computing node has been detected (operation 404). If no discovery process is detected, the computing node may have been booted prior to the EIC receiving the binding information from the fabric manager. The EIC can then initiate a hotplug event and determine the corresponding discovery event (operation 406). On the other hand, if the discovery process is detected, the computing node may have been booted after the EIC has received the binding information from the fabric manager.

Upon detecting the discovery process (operation 404) or initiating the hotplug event (operation 406), the EIC can generate a tier-1 VIS from the information in local registers and present the VIS to the processor (operation 408). The EIC can then determine a tier-2 VIS corresponding to a respective remote EIC as bound to the tier-1 VIS (operation 410). Subsequently, the EIC can determine the accessible target devices in a remote device as bound to tier-2 VIS associated with an EIC in the remote device (operation 412). The EIC can determine the binding information of the tier-2 VIS and the target devices based on the binding information received from the fabric manager.

Figure 4B:
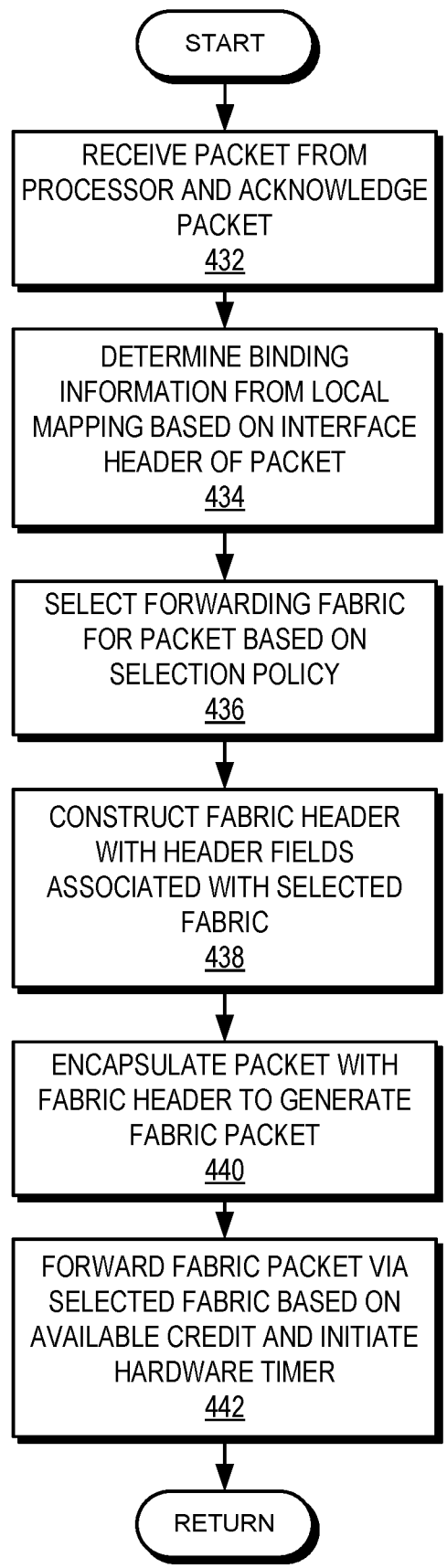
FIG. 4B presents a flowchart illustrating the packet forwarding process in a multi-fabric system, in accordance with an embodiment of the present application.

FIG. 4B presents a flowchart illustrating the packet forwarding process in a multi-fabric system, in accordance with an embodiment of the present application. During operation, an EIC in a computing node coupled to a fabric of the multi-fabric system can receive a packet from the processor of the computing node and acknowledge the packet (operation 432). The EIC can then determine the binding information from the local mapping (e.g., mapping 162 in FIG. 3A) based on the interface header of the packet (operation 434). Subsequently, the EIC can select a forwarding fabric for the packet based on a selection policy (operation 436). The EIC can then construct a fabric header with header fields associated with the selected fabric (operation 438). The EIC can encapsulate the packet with the fabric header to generate a fabric packet (operation 440). The EIC can then forward the fabric packet via the selected fabric based on available credit and initiate a hardware-based timer for the packet (operation 442).

Figure 4C:
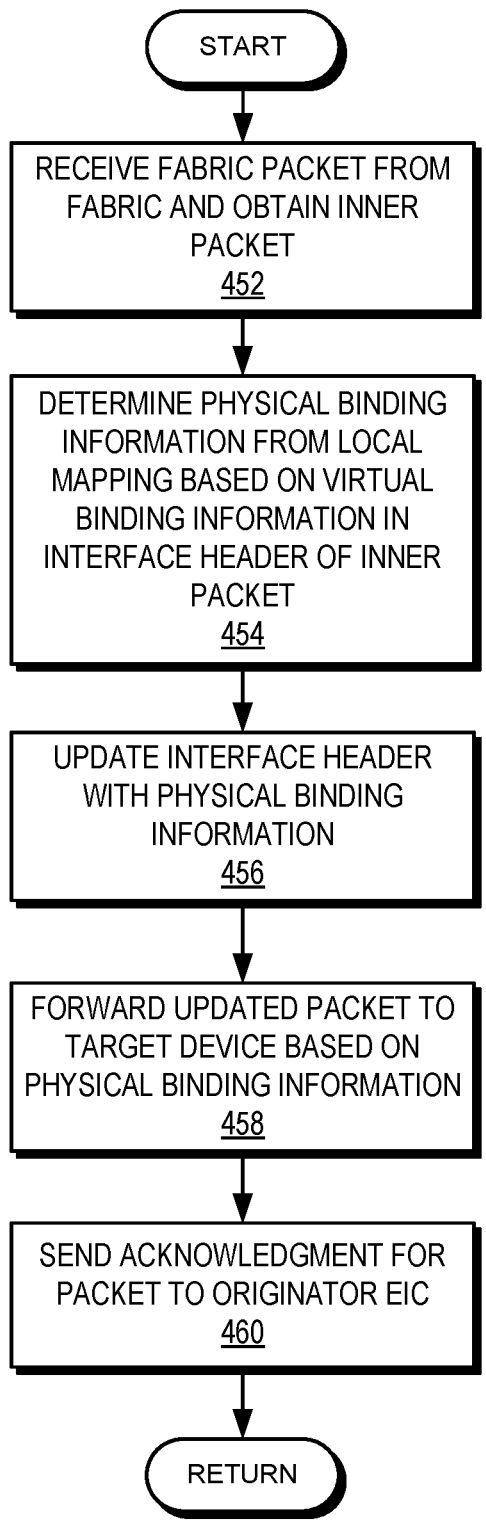
FIG. 4C presents a flowchart illustrating the packet receiving process in a multi-fabric system, in accordance with an embodiment of the present application.

FIG. 4C presents a flowchart illustrating the packet receiving process in a multi-fabric system, in accordance with an embodiment of the present application. During operation, an EIC in a computing node coupled to a fabric of the multi-fabric system can receive a packet from a fabric (operation 452). The EIC can then determine the physical binding information from the local mapping (e.g., mapping 164 in FIG. 3A) based on the virtual binding information in the interface header of the packet (operation 454). Subsequently, the EIC can update the interface header with the physical binding information (operation 456) and forward the updated packet to the target device based on the physical binding information (operation 458). The EIC can then send an acknowledgment for the packet to the originator EIC (operation 460).

Figure 5:
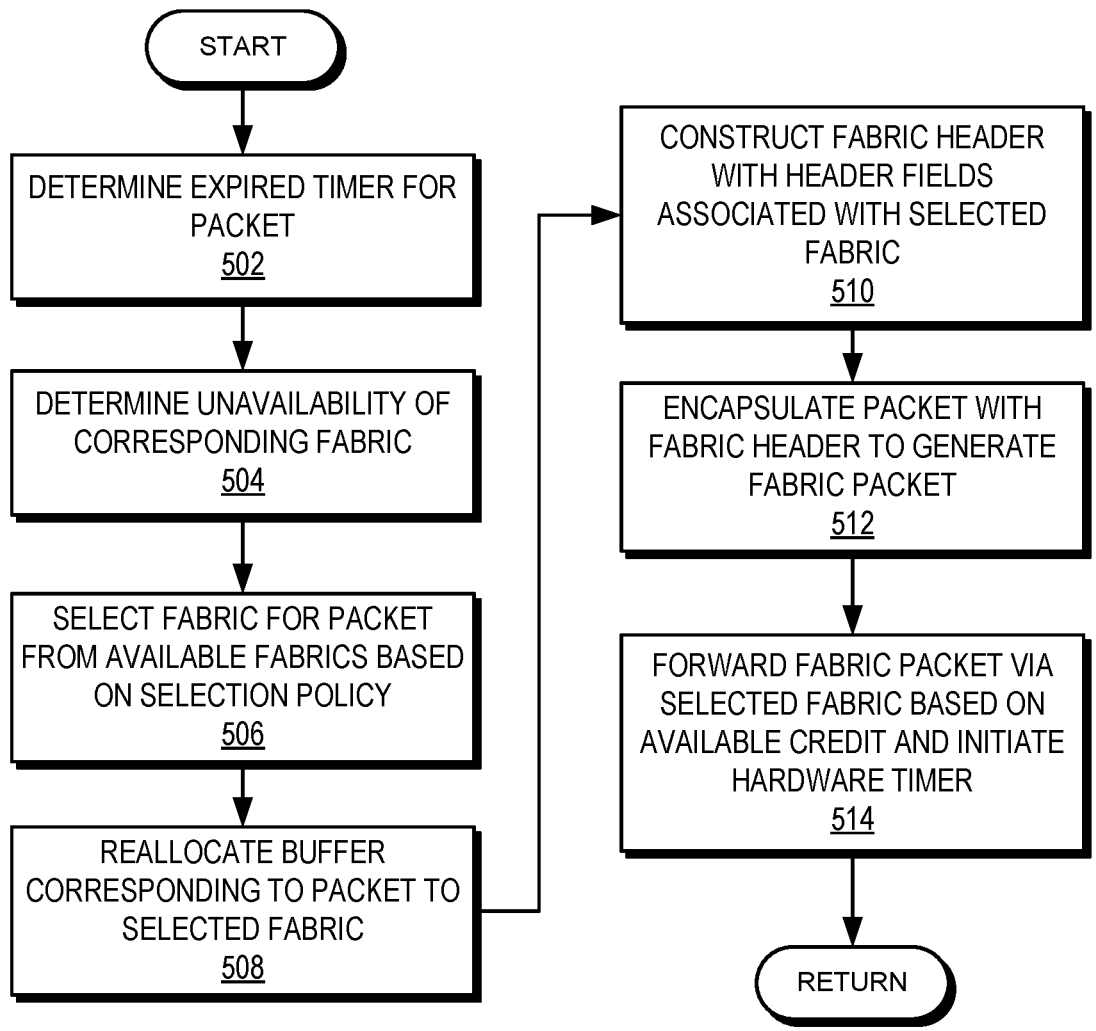
FIG. 5 presents a flowchart illustrating the process of high availability in a multi-fabric system, in accordance with an embodiment of the present application.

FIG. 5 presents a flowchart illustrating the process of high availability in a multi-fabric system, in accordance with an embodiment of the present application. During operation, an EIC in a computing node coupled to a fabric of the multi-fabric system can determine that the timer of a packet has expired (operation 502). The EIC can then determine the unavailability of the corresponding fabric (operation 504). The EIC can select a fabric for the packet from the available fabrics based on a selection policy (operation 506) and reallocate the buffer corresponding to the packet to the selected fabric (operation 508). The EIC can then construct a fabric header with header fields associated with the selected fabric (operation 510). The EIC can encapsulate the packet with the fabric header to generate a fabric packet (operation 512). The EIC can then forward the fabric packet via the selected fabric based on available credit and initiate a hardware-based timer for the packet (operation 514).

Exemplary System

Figure 6:
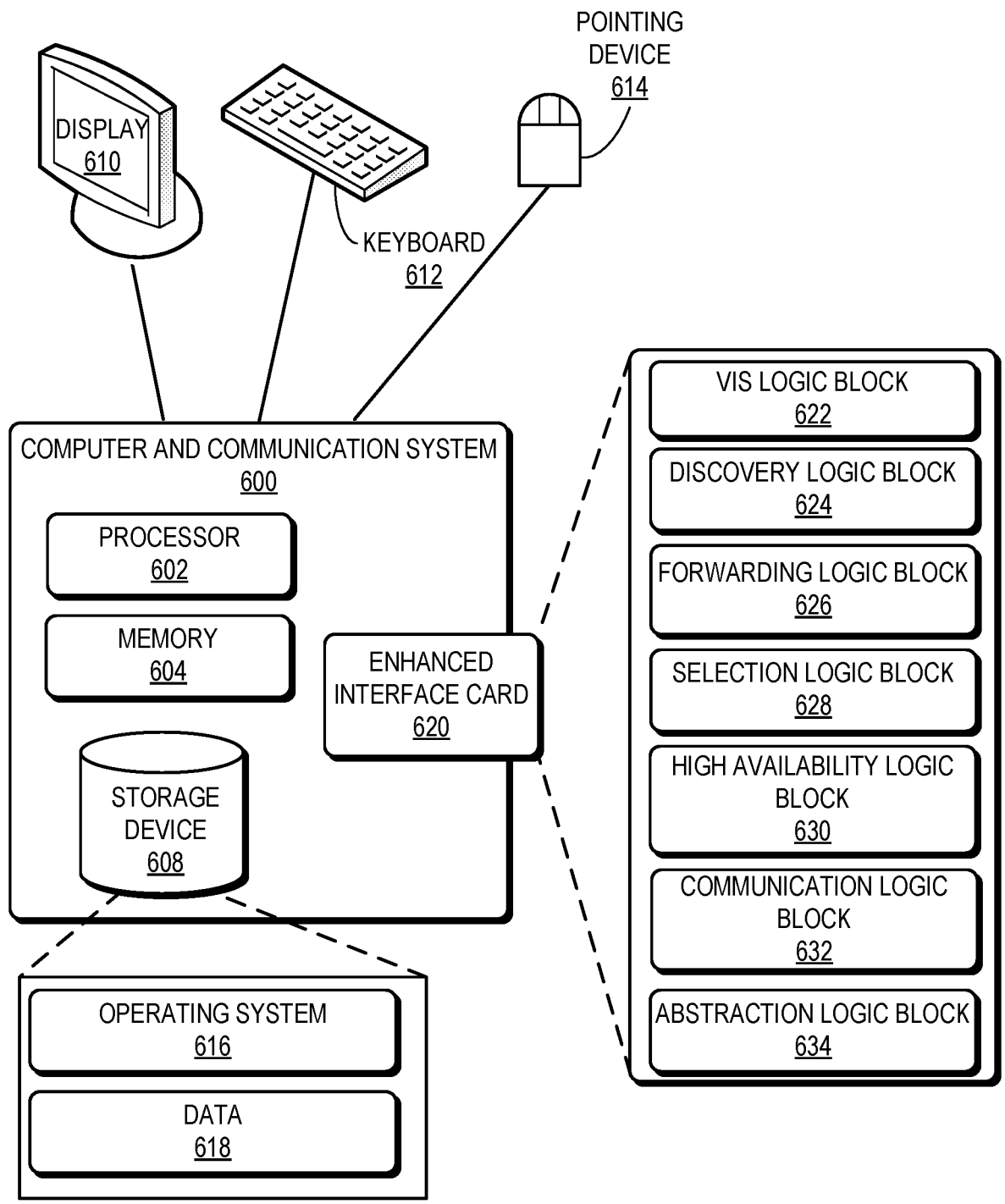
FIG. 6 illustrates an exemplary computer system that facilitates high availability in a multi-fabric system, in accordance with an embodiment of the present application.

FIG. 6 illustrates an exemplary computer system that facilitates high availability in a multi-fabric system, in accordance with an embodiment of the present application. Computer and communication system 600 includes a processor 602, a memory device 604, an EIC 620, and a storage device 608. Memory device 604 can include a volatile memory device (e.g., a dual in-line memory module (DIMM)). Furthermore, computer and communication system 600 can be coupled to a display device 610, a keyboard 612, and a pointing device 614. Storage device 608 can store an operating system 616 and data 618.

EIC 620 can include instructions, which when executed by EIC 620 can cause EIC 620 to perform methods and/or processes described in this disclosure. Specifically, EIC 620 can include instructions for presenting a VIS based on information stored in local registers (VIS logic block 622). In addition, EIC 620 can include instructions for presenting a VIS and a respective target node bound to the VIS during a device discovery process of computer and communication system 600 (e.g., either by the firmware or by operating system 616 during a hotplug event) (discovery logic block 624). EIC 620 can further include instructions for receiving binding information from a fabric manager (discovery logic block 624).

Moreover, EIC 620 can include instructions for encapsulating a packet received based on a VIS in fabric encapsulation and forwarding via a fabric (forwarding logic block 626). EIC 620 can also include instructions for selecting a forwarding fabric for forwarding the fabric packet (selection logic block 628). EIC 620 can include instructions for determining the unavailability of a fabric and switching over the forwarding of packets to an available fabric (high availability logic block 630). EIC 620 can further include instructions for pausing forwarding of subsequent packets via an unavailable fabric and resuming packet forwarding via the fabric upon recovery (high availability logic block 630).

EIC 620 can include instructions for selecting a forwarding fabric for a timed-out packet (selection logic block 628). EIC 620 may further include instructions for sending and receiving packets (e.g., via respective selected fabrics) (communication logic block 632). EIC 620 can also include instructions for ordering packets received from a remote EIC (communication logic block 632). Moreover, EIC 620 can include instructions for maintaining mappings of binding information for facilitating a hardware abstraction layer (abstraction logic block 634). Data 618 can include any data that can facilitate the operations of EIC 620. Data 618 can include, but are not limited to, information related to a respective fabric and the corresponding fabric manager, forwarding and selection policy, and information associated with a respective EIC (e.g., configuration and reachability information stored in a local register).

Figure 7:
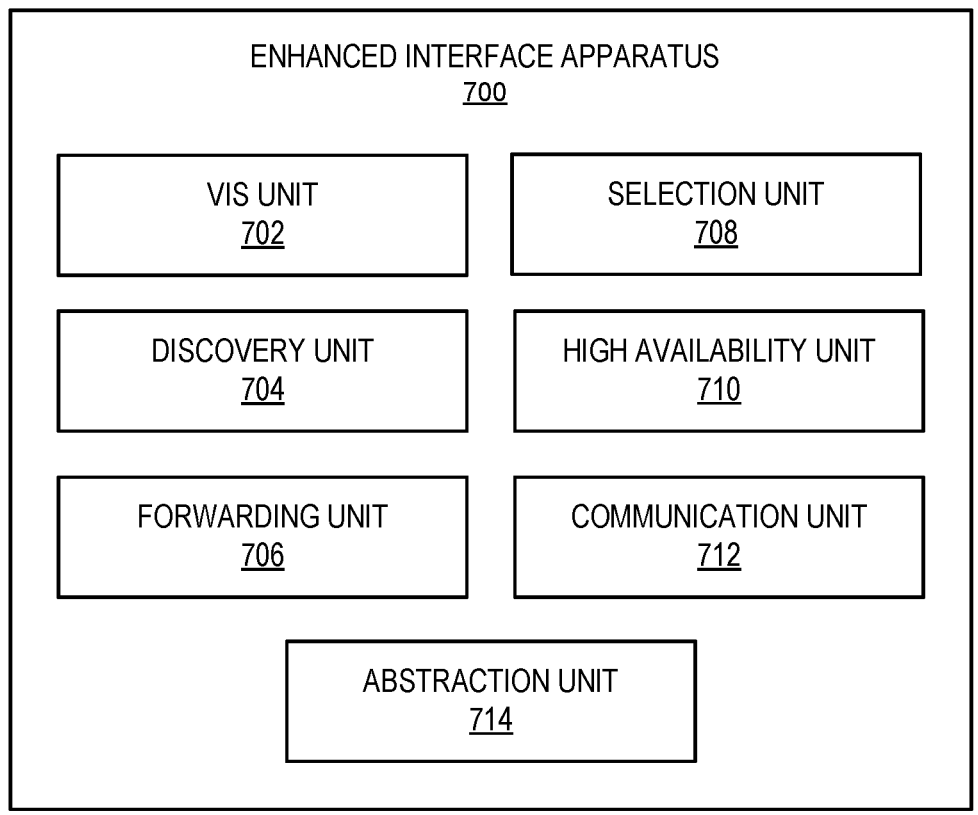
FIG. 7 illustrates an exemplary apparatus that facilitates high availability in a multi-fabric system, in accordance with an embodiment of the present application.

FIG. 7 illustrates an exemplary apparatus that facilitates high availability in a multi-fabric system, in accordance with an embodiment of the present application. Enhanced interface apparatus 700 can comprise a plurality of units or apparatuses which may communicate with one another via a wired, wireless, quantum light, or electrical communication channel. Apparatus 700 may be realized using one or more integrated circuits and may include fewer or more units or apparatuses than those shown in FIG. 7. Further, apparatus 700 may be integrated in a computer system or realized as a separate device that is capable of communicating with other computer systems and/or devices. Specifically, apparatus 700 can comprise units 702-714, which perform functions or operations similar to modules 622-634 of EIC 620 of FIG. 6, including: a VIS unit 702; a discovery unit 704; a forwarding unit 706; a selection unit 708; a high availability unit 710; a communication unit 712, and an abstraction unit 714.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present technology have been presented only for purposes of illustration and description. They are not intended to be exhaustive or to limit this disclosure. Accordingly, many modifications and variations will be apparent to practitioners skilled in the art. The scope of the present technology is defined by the appended claims.

What is claimed is:

1. A method for facilitating high availability using a multi-fabric system, comprising:
   presenting, by a first interface card in a first physical computing device to processing circuitry in the first computing device, a virtual interface switch (VIS) virtually coupled to an interface port of the processing circuitry based on an interconnect within the first computing device;
   presenting to the processing circuitry that a target device is coupled to the VIS via a virtual interface port of the VIS within the first computing device, wherein the target device is reachable from the first computing device via a second interface card of a second computing device, wherein the first and second interface cards are coupled via at least a first fabric and a second fabric, and wherein a respective fabric includes one or more switching devices facilitating communication based on a corresponding fabric switching protocol and is managed by a fabric manager;
   determining, at the first interface card, that a set of packets are directed to the target device in response to determining that the set of packets are issued to the virtual interface port of the VIS from the processing circuitry;
   obtaining the set of packets directed to the target device from the interface port of the processing circuitry; and
   forwarding, to the second interface card, a first subset of the set of packets via the first fabric and a second subset of the set of packets via the second fabric.

2. The method of claim 1, further comprising:
   determining that the processing circuitry has initiated a discovery process via the interface port of the processing circuitry; and
   presenting the VIS to the discovery process as an interface switch providing one or more interfaces within the first computing device for coupling local devices based on information from one or more registers in the first interface card.

3. The method of claim 1, further comprising encapsulating a respective packet of the set of packets with a fabric header, wherein the fabric header includes a set of identifiers corresponding to the first and second interface cards.

4. The method of claim 3, further comprising selecting a forwarding fabric from the first and second fabrics for the encapsulated packet based on a selection policy.

5. The method of claim 3, wherein the fabric header is based on one or more of:
   a message header associated with identifier routing, wherein the set of identifiers includes an originator identifier of the first interface card and a target identifier of the second interface card; and
   a network encapsulation header associated with a networking protocol, wherein the networking protocol is one or more of: an Ethernet protocol, an Internet Protocol (IP), a fabric protocol, and a Gen-Z protocol.

6. The method of claim 1, further comprising:
   receiving, by the first interface card, a second set of packets from the second interface card of the second computing device, wherein a first subset of the second set of packets is received via the first fabric and a second subset of the second set of packets is received via the second fabric; and
   ordering, by the first interface card, the second set of packets based on corresponding sequence numbers.

7. The method of claim 1, further comprising:
   determining that the first fabric has become unavailable; and
   resending unacknowledged packets in the first subset of the set of packets via the second fabric.

8. The method of claim 7, further comprising:
   pausing forwarding of subsequent packets via the first fabric in response determining that the first fabric has become unavailable; and
   reallocating buffers associated with the first fabric to the second fabric.

9. The method of claim 1, further comprising receiving binding information associated with a second VIS presented by the second interface card, wherein the target device is bound to the second VIS and the second VIS is bound to the VIS.

10. The method of claim 1, further comprising:
    obtaining binding information associated with the target device from the fabric manager;
    maintaining a mapping between virtual and physical bindings of the target device based on the binding information.

11. An apparatus in a first computing device, comprising:
    control circuitry facilitating a virtual interface switch (VIS) logic block, a discovery logic block, and a forwarding logic block;
    wherein the virtual interface switch (VIS) logic block is to present, to processing circuitry in first the computing device, a VIS virtually coupled to an interface port of the processing circuitry based on an interconnect within the first computing device;
    wherein the discovery logic block is to present to the processing circuitry that a target device is coupled to the VIS via a virtual interface port of the VIS within first the computing device, wherein the target device is reachable from the first computing device via a remote apparatus of a second computing device, wherein the apparatus and the remote apparatus are coupled via at least a first fabric and a second fabric, and wherein a respective fabric includes one or more switching devices facilitating communication based on a corresponding fabric switching protocol and is managed by a fabric manager; and wherein the forwarding logic block is to:
determine that a set of packets are directed to the target device in response to determining that the set of packets are issued to the virtual interface port of the VIS from the processing circuitry;
obtain the set of packets directed to the target device from the interface port of the processing circuitry; and
forward, to the remote apparatus, a first subset of the set of packets via the first fabric and a second subset of the set of packets via the second fabric.

12. The apparatus of claim 11, wherein the discovery logic block is further to:
determine that the processing circuitry has initiated a discovery process via the interface port of the processing circuitry; and
present the VIS to the discovery process as an interface switch providing one or more interfaces within the first computing device for coupling local devices based on information from one or more registers in the apparatus.

13. The apparatus of claim 11, wherein the forwarding logic block is further to encapsulate a respective packet of the set of packets with a fabric header, wherein the fabric header includes a set of identifiers corresponding to the apparatus and the remote apparatus.

14. The apparatus of claim 13, wherein the control circuitry further facilitates a selection logic block to select a forwarding fabric from the first and second fabrics for the encapsulated packet based on a selection policy.

15. The apparatus of claim 13, wherein the fabric header is based on one or more of:
a message header associated with identifier routing, wherein the set of identifiers includes an originator identifier of the apparatus and a target identifier of the remote apparatus; and
a network encapsulation header associated with a networking protocol, wherein the networking protocol is one or more of: an Ethernet protocol, an Internet Protocol (IP), a fabric protocol, and a Gen-Z protocol.

16. The apparatus of claim 11, wherein the control circuitry further facilitates:
a communication logic block is to:
receive a second set of packets from the remote apparatus, wherein a first subset of the second set of packets is received via the first fabric and a second subset of the second set of packets is received via the second fabric; and
order the second set of packets based on corresponding sequence numbers.

17. The apparatus of claim 11, wherein the control circuitry further facilitates a high availability logic block to determine that the first fabric has become unavailable; and
wherein the forwarding logic block is further to resend unacknowledged packets in the first subset of the set of packets via the second fabric.

18. The apparatus of claim 17, wherein the high availability logic block is further to pause forwarding of subsequent packets via the first fabric in response determining that the first fabric has become unavailable; and
wherein the forwarding logic block is further to reallocate buffers associated with the first fabric to the second fabric.

19. The apparatus of claim 11, wherein the VIS logic block is further to receive binding information associated with a second VIS presented by the remote apparatus, wherein the target device is bound to the second VIS and the second VIS is bound to the VIS.

20. The apparatus of claim 11, wherein the discovery logic block is further to obtain binding information associated with the target device from the fabric manager; and
wherein the control circuitry further facilitates an abstraction logic block to maintain a mapping between virtual and physical bindings of the target device based on the binding information.

* * * * *